(12) United States Patent
Lee et al.

(10) Patent No.: US 10,545,278 B2
(45) Date of Patent: Jan. 28, 2020

(54) OPTICAL MEMBER AND DISPLAY INCLUDING THE SAME

(71) Applicant: Samsung Display Co. Ltd., Yongin-si, Gyeonggi-do (KR)

(72) Inventors: Sang Won Lee, Seoul (KR); Seong Yong Hwang, Hwaseong-si (KR); Hye Eun Park, Hwaseong-si (KR); Sung Kyu Shim, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 16/126,624

(22) Filed: Sep. 10, 2018

(65) Prior Publication Data

US 2019/0154901 A1 May 23, 2019

(30) Foreign Application Priority Data

Nov. 20, 2017 (KR) .......................... 10-2017-0155054

(51) Int. Cl.
*F21V 8/00* (2006.01)
*G02F 1/13357* (2006.01)
*G02F 1/1335* (2006.01)

(52) U.S. Cl.
CPC ........... *G02B 6/005* (2013.01); *G02F 1/1336* (2013.01); *G02B 6/002* (2013.01); *G02B 6/0043* (2013.01); *G02F 2001/133614* (2013.01)

(58) Field of Classification Search
CPC ...... G02B 6/005; G02B 6/0043; G02B 6/002; G02F 1/1336; G02F 2001/133614
See application file for complete search history.

(56) References Cited

U.S. PATENT DOCUMENTS

| | | | |
|---|---|---|---|
| 2014/0063843 A1* | 3/2014 | Yeo | G02B 6/002 362/608 |
| 2016/0185901 A1* | 6/2016 | Chei | C08G 64/06 362/629 |
| 2016/0259121 A1* | 9/2016 | Yonezawa | G02F 1/1333 |
| 2018/0039006 A1* | 2/2018 | Gotou | F21S 2/00 |

(Continued)

FOREIGN PATENT DOCUMENTS

| | | |
|---|---|---|
| JP | 2010537364 A | 12/2010 |
| KR | 101597335 B1 | 2/2016 |

(Continued)

*Primary Examiner* — Tracie Y Green
(74) *Attorney, Agent, or Firm* — Cantor Colburn LLP

(57) ABSTRACT

An optical member includes a light guide plate in which light incident thereto is propagated, including: an emission surface through which propagated light exits the light guide plate, a light incident side surface through which the light is incident to the light guide plate, and an inclined edge surface connecting the emission and light incident side surfaces to each other; and a wavelength conversion layer to which exited light from the light guide plate is incident and which converts a wavelength of the exited light, disposed facing the emission surface of the light guide plate. The inclined edge surface and emission surfaces define a boundary therebetween, and a side surface of the wavelength conversion layer which is closest to the light incident side surface is further from the light incident side surface than the boundary between the inclined edge surface and the emission surface.

17 Claims, 10 Drawing Sheets

(56) References Cited

U.S. PATENT DOCUMENTS

2018/0364408 A1  12/2018  Hwang et al.
2019/0011779 A1  1/2019  Lee et al.

FOREIGN PATENT DOCUMENTS

| KR | 1020170044345 A | 4/2017 |
| KR | 1020180137627 A | 12/2018 |
| KR | 1020190006137 A | 1/2019 |

* cited by examiner

OPTICAL MEMBER AND DISPLAY INCLUDING THE SAME

This application claims priority to Korean Patent Application No. 10-2017-0155054 filed on Nov. 20, 2017 and all the benefits accruing therefrom under 35 U.S.C. § 119, the contents of which in their entirety are herein incorporated by reference.

BACKGROUND

1. Field

Exemplary embodiments relate to an optical member and a display device including the same.

2. Description of the Related Art

A liquid crystal display ("LCD") device displays an image by receiving light from a backlight assembly. Some backlight assemblies include a light source and a light guide plate. The light guide plate receives light from the light source and guides the light toward a display panel of the LCD device.

Generally, a point light source such as a light-emitting diode ("LED") is frequently used as the light source within backlight assemblies. However, a point light source emits scattered light, such that total reflection of light within a light guide plate is determined by an angle of light entering the light guide plate.

SUMMARY

One or more exemplary embodiment of the invention provides an optical member having an excellent light guide function.

It should be noted that features of the present disclosure are not limited to the above-described object, and other features of the present disclosure will be apparent to those skilled in the art from the following descriptions.

According to some exemplary embodiments, an optical member includes a light guide plate in which light incident thereto is propagated, including: an emission surface through which propagated light exits the light guide plate, a light incident side surface through which the light is incident to the light guide plate, and an inclined edge surface connecting the emission surface and the light incident side surface to each other; and a wavelength conversion layer to which exited light from the light guide plate is incident and which converts a wavelength of the exited light, disposed facing the emission surface of the light guide plate. The inclined edge surface and the emission surface of the light guide plate define a boundary therebetween, an a side surface of the wavelength conversion layer which is closest to the light incident side surface of the light guide plate is further from the light incident side surface than the boundary between the inclined edge surface and the emission surface of the light guide plate.

According to some exemplary embodiments, an optical member includes a light guide plate in which light incident thereto is propagated, including: an emission surface through which propagated light exits the light guide plate, a light incident side surface through which the light is incident to the light guide plate, an inclined edge surface connecting the emission surface and the light incident side surface to each other; a wavelength conversion layer to which exited light from the light guide plate is incident and which converts a wavelength of the exited light, disposed facing the emission surface of the light guide plate; and a light adjustment member with which a path of light is adjusted to be incident into the light guide plate, disposed facing the inclined edge surface of the light guide plate and spaced apart from the wavelength conversion layer. A first region of the light guide plate extends from the light incident side surface thereof to an end of the light adjustment member furthest from the light incident side surface, a second region of the light guide plate extends from the first region in a direction away from the light incident side surface and includes the wavelength conversion member facing the emission surface of the light guide plate, and a thickness of the light adjustment member with respect to the light guide plate is maximum at a boundary between the first region and the second region of the light guide plate.

According to some exemplary embodiments, an optical member includes a light guide plate in which light incident thereto is propagated, including: an emission surface through which propagated light exits the light guide plate, and a light incident side surface through which the light is incident to the light guide plate; a refractive layer which is disposed facing the emission surface of the light guide plate and receives light exited therethrough, a refractive index of the refractive layer being smaller than that of the light guide plate; a wavelength conversion layer to which light from the refractive layer is incident and which converts a wavelength of the light incident thereto, disposing the refractive layer between the emission surface of the light guide plate and the wavelength conversion layer; a passivation layer to which light from the wavelength conversion layer is incident and through which light exits from the optical member, disposed covering a side surface of the refractive layer and a side surface of the wavelength conversion layer, and an angle filter disposed on the light incident side surface of the light guide plate. The angle filter reflects light having an incident angle equal to or larger than a first angle with respect to the light incident side surface of the light guide plate and passes light having an incident angle smaller than the first angle.

BRIEF DESCRIPTION OF THE DRAWINGS

The above and other features of the present disclosure will become more apparent by describing in detail exemplary embodiments thereof with reference to the attached drawings, in which.

DETAILED DESCRIPTION

Figure 1:
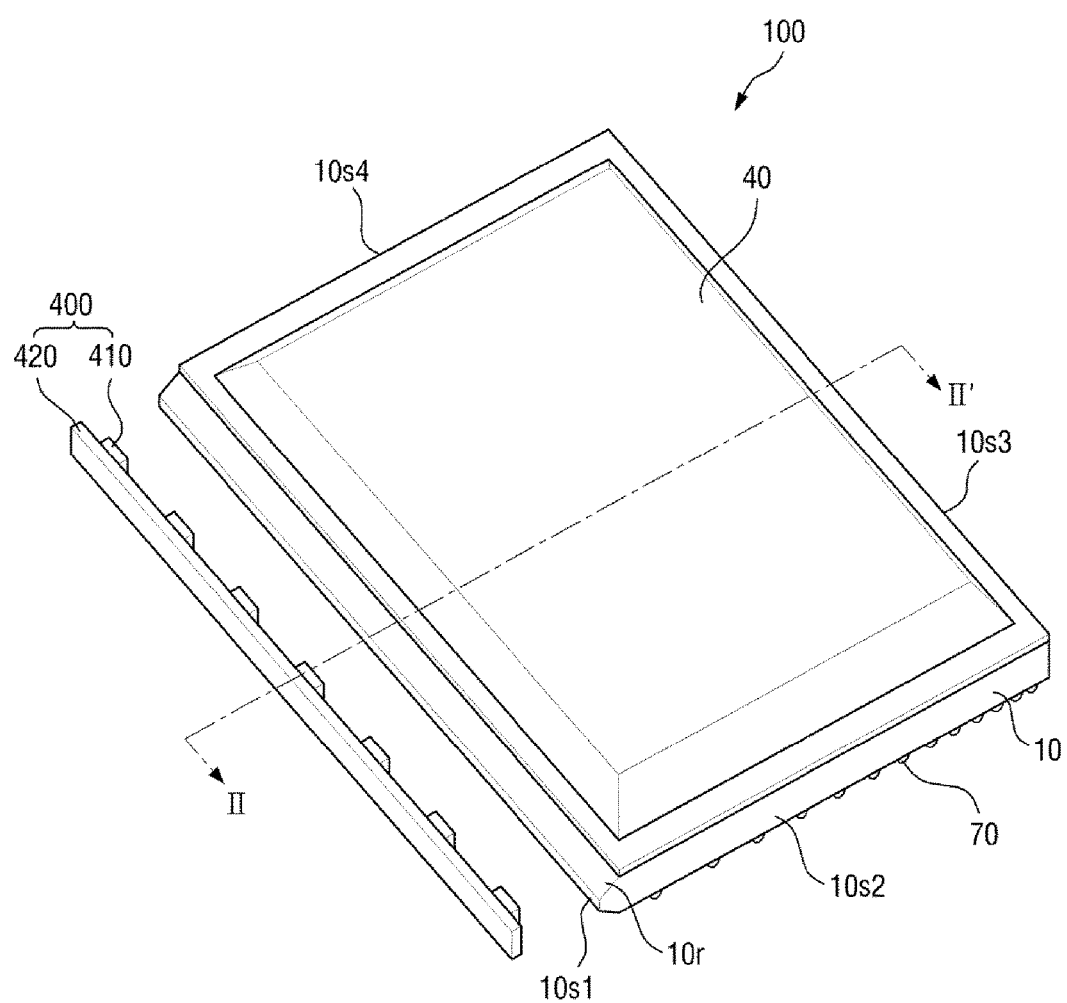
FIG. 1 is a perspective view of an exemplary embodiment of an optical member of a display device according to the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the spirit and the scope of the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being related to another element such as being "on," "connected to" or "coupled to" another element, it may be directly on, connected to, or coupled to the other element or intervening elements may be present. When, however, an element is referred to as being related to another element such as being "directly on," "directly connected to," or "directly coupled to" another element, there are no intervening elements present. To this end, the term "connected" may refer to physical, electrical and/or fluid connection.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an" and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art. For example, "about" can mean within one or more standard deviations, or within ±30%, 20%, 10% or 5% of the stated value.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
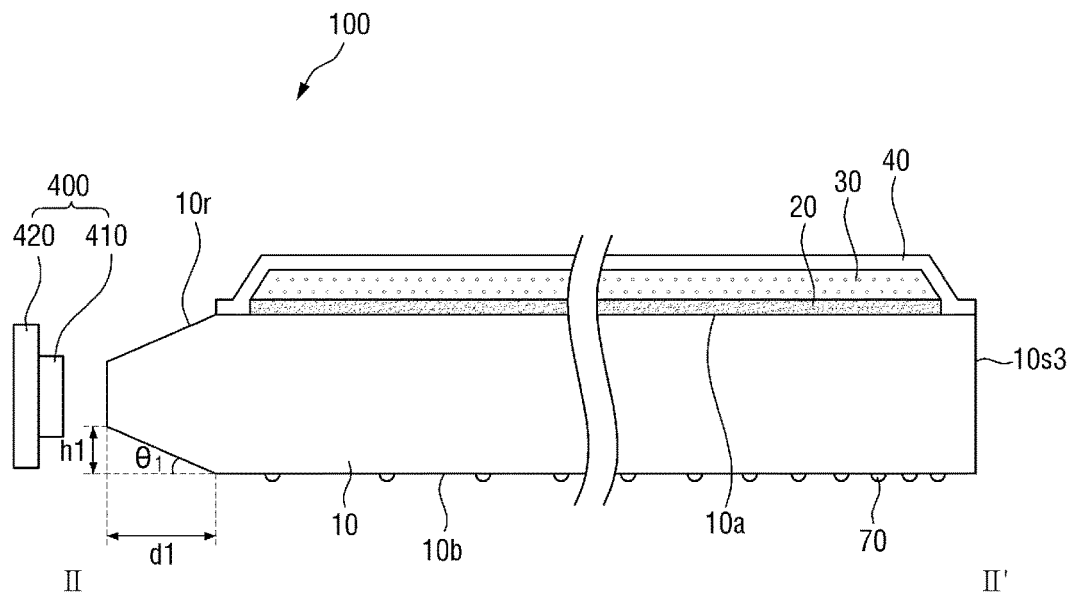
FIG. 2 is a cross-sectional view taken along line II-II' of FIG. 1.

FIG. 1 is a perspective view of an optical member according to an exemplary embodiment. FIG. 2 is a cross-sectional view taken along line II-II' of FIG. 1. The optical member may be applied to display devices which display an image with light provided from the optical member, lighting fixtures which provide light within various devices and the like.

Referring to FIGS. 1 and 2, an optical member 100 includes a light guide plate 10, a (relatively) low refractive (index) layer 20, a wavelength conversion layer 30 disposed on the low refractive layer 20, and a passivation layer 40 disposed on the wavelength conversion layer 30. The light guide plate 10, the low refractive layer 20, the wavelength conversion layer 30 and the passivation layer 40 may be integrally coupled together.

The optical member 100 and components thereof may be disposed in a plane defined by first and second directions crossing each other. In FIG. 1, for example, the first and second directions may be respectively extended along the relatively long and relatively short sides of the optical member 100. A thickness of the optical member 100 and components thereof may be defined in a third direction which crosses each of the first and second directions. In FIG. 2, for example, the third direction may be vertical, while the first or second direction is horizontal.

The light guide plate 10 serves to guide light along a travel path. The light travels within the light guide plate 10 to be emitted therefrom to outside the light guide plate 10. The light guide plate 10 may include an inorganic material. As an example, the light guide plate 10 may include glass, but is not limited thereto.

The light guide plate 10 may generally have a polygonal pillar shape. A planar shape of the light guide plate 10 may be rectangular in a top plan view, but is not limited thereto. In an exemplary embodiment, the light guide plate 10 may have a hexagonal pillar shape whose planar shape is rectangular. Such light guide plate 10 may include an upper surface 10a, a lower surface 10b, and four side surfaces 10s (10s1, 10s2, 10s3 and 10s4). Light propagated within the light guide plate 10 may exit the light guide plate 10 through the upper surface 10a thereof. The side surfaces of the light guide plate 10 connect the upper and lower surfaces 10a and 10b to each other. In this specification and the accompanying drawings, the four side surfaces are indicated as "10s1," "10s2," "10s3" and "10s4" when it is necessary to distinguish the four side surfaces from each other, but "10s" is used to simply generally indicate a side surface. The label "10s" may also be used to indicate a general collection of the side surfaces which connect the upper and lower surfaces 10a and 10b to each other.

In an exemplary embodiment, each of the upper surface 10a and the lower surface 10b of the light guide plate 10 is positioned in one plane. The plane in which the upper surface 10a is positioned and the plane in which the lower surface 10b is positioned are generally parallel to each other such that the light guide plate 10 may have substantially the same thickness overall across an entirety of the upper and/or lower surfaces 10a and 10b. However, the planes in which the upper and lower surfaces 10a and 10b are positioned are not limited to planes parallel to each other. Portions of the upper surface 10a and/or the lower surface 10b may be disposed in a plurality of planes. The planes in which the upper and/or lower surfaces 10a and 10b are positioned may intersect each other.

The light guide plate 10 may further include an inclined edge surface 10r between the upper surface 10a and a side surface 10s and/or the lower surface 10b and the side surface 10s. The upper/lower surface 10a/10b of the light guide plate 10 meets a first side (end) of the edge surface 10r, and the side surface 10s of the light guide plate 10 meets a second side (end) of the edge surface 10r opposite to the first side thereof.

The edge surface 10r is inclined with respect to the upper/lower surface 10a/10b and the side surface 10s. An inclination angle θ1 of the edge surface 10r with respect to the upper/lower surface 10a/10b may be about 6 degrees (°) to about 20°. A length d1 of a section of a plane occupied by the edge surface 10r, that is, the distance d1 from a boundary between the edge surface 10r of the light guide plate 10 and the upper/lower surface 10a/10b to the side surface 10s, may be about 0.84 millimeter (mm) or more, more preferably 1 mm or more. A height h1 of the edge surface 10r, that is, the distance h1 from a boundary between the edge surface 10r and the side surface 10s to the upper/lower surface 10a/10b, may be determined by the inclination angle θ1 of the edge surface 10r and the length d1 of the edge surface 10r. Also, the height h1 and the inclination angle θ1 of the edge surface 10r may be determined in consideration of a planar area of a light incident surface 10s1 (e.g., product of a dimension thereof in the vertical direction and a dimension thereof extended into the page of FIG. 2) of the light guide plate 10. In other words, a minimum total planar area of the light incident surface 10s1 of the light guide plate 10 may be disposed or formed to be larger than a maximum total planar area of a light emission window of a light source 400 (member), and the height h1 and the inclination angle θ1 formed by the edge surfaces 10r may be determined in consideration of the total planar area of the light incident surface 10s1. The light incident surface 10s1 and the one or more edge surface 10r may collectively define a side surface of the light guide plate 10.

The one or more edge surface 10r may serve to reduce or effectively prevent damage of the light guide plate 10 from external impact thereto by reducing the sharpness of a transition from the upper/lower surface 10a/10b and the light incident surface 10s1 at an edge portion of the light guide plate 10. Also, the one or more edge surface 10r adjusts a path of light at the light incident surface 10s1 of the light guide plate 10 to efficiently cause total reflection in the light guide plate 10 and to reduce or effectively prevent light leakage at the light incident surface 10s1. This will be described below with reference to FIGS. 3 to 6.

Figure 7:
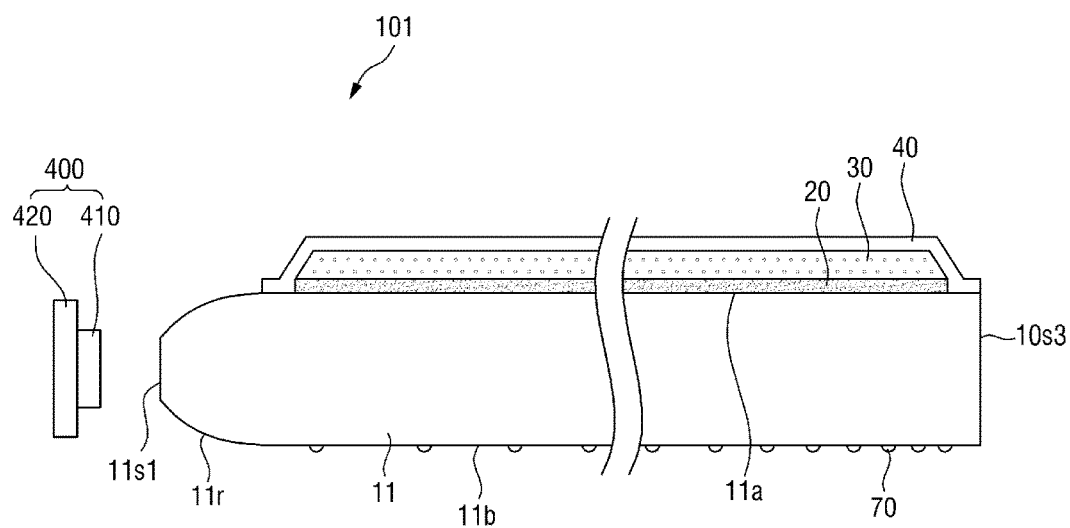
FIGS. 7 to 9 are cross-sectional views of modified exemplary embodiments of an optical member according to the invention.

In cross-section the one or more edge surface 10r may be a flat surface disposed at an incline, or may be a curved surface disposed at an incline (refer to edge surface 11r of an optical member 101 of FIG. 7).

Figure 10:
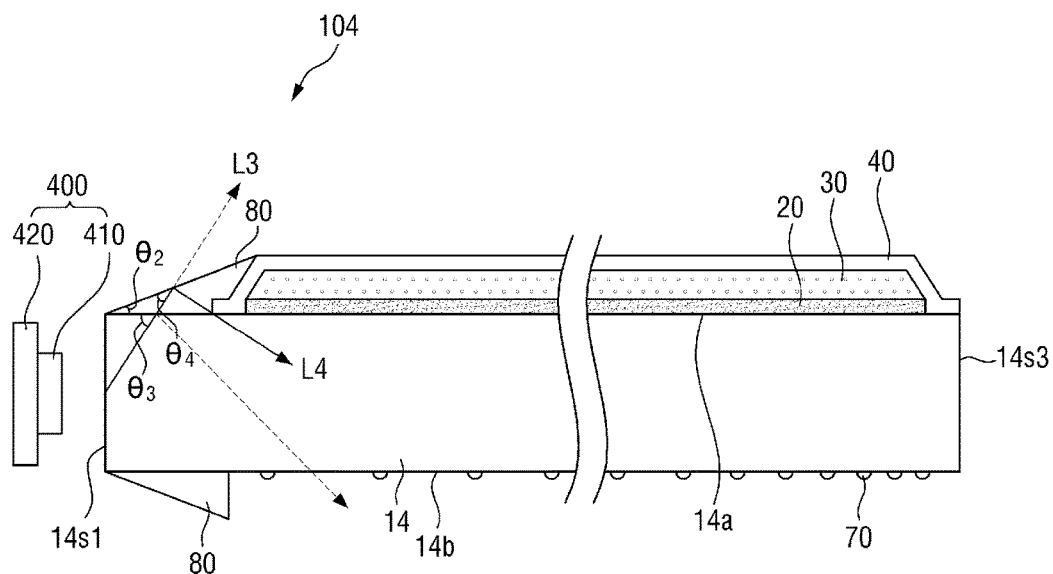
FIGS. 10 to 12 are cross-sectional views of other exemplary embodiments of an optical member according to the invention.
Figure 13:
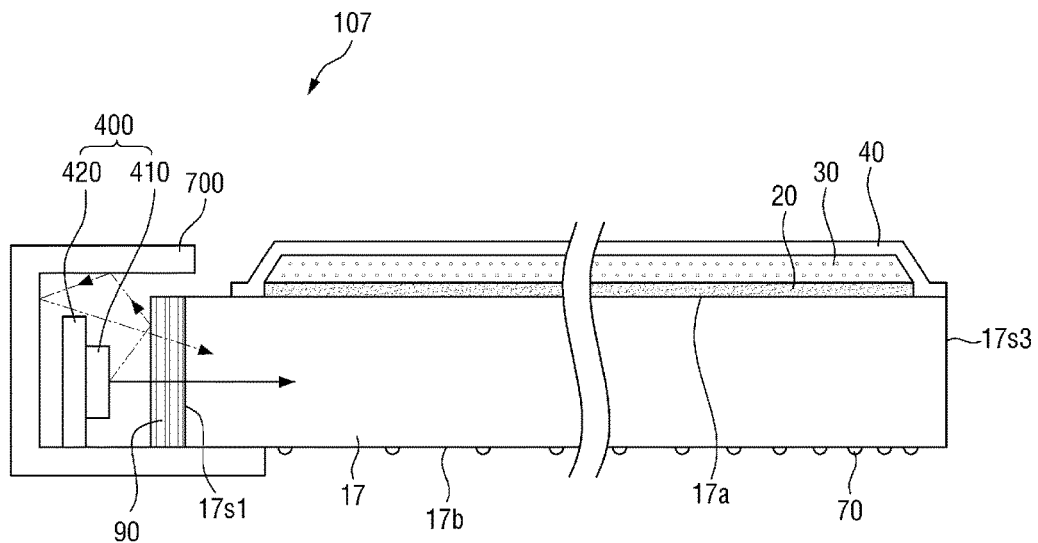
FIG. 13 is a cross-sectional view of still another exemplary embodiment of an optical member according to the invention.

However, the present disclosure is not limited to a case in which an edge surface is defined for the light guide plate 10. As shown in FIGS. 10 and 13, planes in which upper surfaces 14a and 17a and/or lower surfaces 14b and 17b of light guide plates 14 and 17 are positioned may be inclined by about 90° with respect to planes in which respective side surfaces 14s and 17s are positioned. A case in which the light guide plate 10 includes the edge surfaces 10r will be described below.

In an application example of the optical member 100, the light source 400 may be disposed adjacent to at least one side surface 10s of the light guide plate 10, to define a light incident side surface thereof. Although drawings show a case in which a point light source such as a light-emitting diode ("LED") 410 is provided in plurality mounted on a single one printed circuit board ("PCB") 420 to be disposed adjacent to the side surface 10s1 positioned at one relatively long side of the light guide plate 10, a position of the plurality of LED light sources 410 is not limited thereto. In an exemplary embodiment, for example, the plurality of LED light sources 410 may be disposed adjacent to both the side surfaces 10s1 and 10s3 at the relatively long sides of the optical member 100, and/or may be disposed adjacent to both or one of the side surfaces 10s2 and 10s4 of the relatively short sides of the optical member 100.

In the exemplary embodiment of FIG. 1, the side surface 10s1 at a first relatively long side of the light guide plate 10 to which the light source 400 is adjacently disposed is the light incident surface (indicated as "10s1" in drawings for convenience of description). Light of the light source 400 is directly incident to the light incident surface 10s1, and the side surface 10s3 at a second relatively long side opposite to the first relatively long side is a light-facing surface (indicated as "10s3" in drawings for convenience of description).

A scattering pattern 70 may be disposed in plurality at the lower surface 10b of the light guide plate 10. The scattering pattern 70 serves to change an angle of light which travels within the light guide plate 10 by total reflection and to project the light from the light guide plate 10.

In an exemplary embodiment, the scattering pattern 70 may be disposed or formed as a portion of the light guide plate 10 which is protruded from or recessed into a main body thereof relative to the upper and/or lower surface 10a and 10b thereof. In an exemplary embodiment, for example, a groove may be disposed or formed recessed from the lower surface 10b of the light guide plate 10 to function as the scattering pattern 70.

In another exemplary embodiment, the scattering pattern 70 may be provided as a separate layer or pattern relative to the light guide plate 10. In an exemplary embodiment, for example, a print pattern or a pattern layer including a protruding pattern and/or a groove pattern separate from the light guide plate 10 may be disposed or formed on the lower surface 10b of the light guide plate 10 to function as the scattering pattern 70.

A density of disposition of the scattering pattern 70 provided in plurality may be controlled differently regions of the light guide plate 10. In an exemplary embodiment, for example, the density of disposition of scattering patterns 70 may be relatively low in a region of the light guide plate 10 adjacent to the light incident surface 10s1 through which a relatively large amount of light travels into the light guide plate 10. The density of disposition of scattering patterns 70 may be relatively high in a region of the light guide plate 10 adjacent to the light-facing surface 10s3 through or at which a relatively small amount of light travels.

The low refractive layer 20 is disposed on the upper surface 10a of the light guide plate 10 through which light is emitted from the light guide plate 10. The low refractive layer 20 is interposed between the light guide plate 10 and the wavelength conversion layer 30 and helps with total reflection of light within the light guide plate 10. The low refractive layer 20 may be disposed in an active area of the light guide plate 10 at which light exits from the optical member 100. In an exemplary embodiment, for example, the active area of the light guide plate 10 may corresponding to a display area of a display panel at which an image is displayed with light from the optical member 100, without being limited thereto. The active area of the light guide plate 10 may correspond to a light incident area of a component external to the optical member 100 without being limited thereto.

More specifically, it is desirable to provide effective total internal reflection at the upper surface 10a and the lower surface 10b of the light guide plate 10 so that light is efficiently guided by the light guide plate 10 from the light incident surface 10s1 thereof to the light-facing surface 10s3 thereof. One of the conditions for total internal reflection in the light guide plate 10 is that a refractive index of the light guide plate 10 is higher than that of a medium having an optical interface with the light guide plate 10.

In an exemplary embodiment, for example, the light guide plate 10 may include glass having a refractive index of about 1.5. In this case, when the upper surface 10a of the light guide plate 10 has an optical interface with an air layer, light incident at an angle of larger than about 42°, which is a threshold angle θt1 (refer to FIG. 3) of the light guide plate 10, may be totally reflected.

On the other hand, when optical function layers having relatively high refractive indices are stacked on the upper surface 10a of the light guide plate 10, a threshold angle of the light guide plate 10 becomes too large for sufficient total reflection. The wavelength conversion layer 30 stacked on the upper surface 10a of the light guide plate 10 generally has a refractive index of about 1.5. When the wavelength conversion layer 30 is directly stacked on the upper surface 10a of the light guide plate 10 having a refractive index of about 1.5, achieving total reflection at the upper surface 10a of the light guide plate 10 may be difficult.

The low refractive layer 20, which is interposed between the light guide plate 10 and the wavelength conversion layer 30 and has an interface with the upper surface 10a of the light guide plate 10, has a lower refractive index than that of the light guide plate 10 so that total reflection occurs at the upper surface 10a of the light guide plate 10.

A difference in refractive index between the light guide plate 10 and the low refractive layer 20 may be about 0.2 or more. When the refractive index of the low refractive layer 20 is smaller than the refractive index of the light guide plate 10 by about 0.2 or more, sufficient total reflection may occur at the upper surface 10a of the light guide plate 10. The difference in refractive index between the light guide plate 10 and the low refractive layer 20 has no upper limit, but may be about 1 or less in consideration of the refractive indices of the light guide plate 10 and the low refractive layer 20 that are generally used.

The refractive index of the low refractive layer 20 may range from about 1.2 to about 1.4. In general, when a refractive index of a solid medium approaches 1, a manufacturing cost of the solid medium exponentially increases. When the refractive index of the low refractive layer 20 is about 1.2 or more, an excessive increase in the manufacturing cost may be reduced or effectively prevented. Also, the low refractive layer 20 may have a refractive index of about 1.4 or less so as to sufficiently reduce a total-reflection threshold angle of light at the upper surface 10a of the light guide plate 10. In an exemplary embodiment, the low refractive layer 20 may have a refractive index of about 1.25.

The low refractive layer 20 may include voids defined therein to provide the above-described low refractive index. The voids may be a vacuum, or may be filled with a medium such as air, a gas and the like.

The low refractive layer 20 may cover most of the upper surface 10a of the light guide plate 10 but may not overlap the edge surface 10r of the light guide plate 10. That is, the edge surface 10r is exposed to outside the light guide plate 10 by termination of the low refractive layer 20 at a light incident edge of the light guide plate 10. A side surface of the low refractive layer 20 may be positioned further inward from the side surface 10s1 than the boundary between the upper surface 10a of the light guide plate 10 and the edge surface 10r. In other words, the edge surface 10r of the light guide plate 10 may protrude from the side surface of the low refractive layer 20.

The low refractive layer 20 of the optical member 100 may be formed by using a method such as coating and the like. In an exemplary embodiment of manufacturing a display device, for example, a material for forming a low refractive layer is slit-coated on the upper surface 10a of the light guide plate 10 and then dried and cured to form the low refractive layer 20. However, the method is not limited thereto, and various lamination methods may be used.

The wavelength conversion layer 30 is disposed on the low refractive layer 20. The wavelength conversion layer 30 converts a wavelength of at least a part of incident light. The wavelength conversion layer 30 may include a binder layer and wavelength conversion particles which are distributed in the binder layer. The wavelength conversion layer 30 may further include scattering particles which are distributed in the binder layer in addition to the wavelength conversion particles.

The wavelength conversion particles are particles which convert a wavelength of incident light to a wavelength different therefrom. In an exemplary embodiment, for example, the wavelength conversion particles may be quantum dots ("QD"s), a fluorescent material or a phosphorescent material.

The wavelength conversion particles may include a plurality of wavelength conversion particles which convert a wavelength of incident light into different wavelengths. In an exemplary embodiment, for example, the wavelength conversion particles may include first wavelength conversion particles which convert incident light of a specific wavelength into a first wavelength and emit the converted light of the first wavelength, and may include second wavelength conversion particles which convert incident light of the specific wavelength into a second wavelength and emit the converted light of the second wavelength. In an exemplary embodiment, light which is projected from the light source 400 and incident on the wavelength conversion particles may be light of a blue wavelength, the first wavelength may be a green wavelength, and the second wavelength may be a red wavelength.

In the exemplary embodiment, while blue light incident on the wavelength conversion layer 30 passes through the wavelength conversion layer 30, a first portion of the blue light may be incident on the first wavelength conversion particles, converted into the green wavelength, and emitted from the wavelength conversion layer 30. A second portion of the blue light may be incident on the second wavelength conversion particles, converted into the red wavelength, and emitted from the wavelength conversion layer 30. A third (or remaining) portion of the blue light may not be incident on the first and second wavelength conversion particles to be emitted from the wavelength conversion layer 30 without being converted to a different wavelength. Therefore, the light passing through and emitted from the wavelength conversion layer 30 includes all light of the blue wavelength, the green wavelength and the red wavelength. Where the light passing through and emitted from the wavelength conversion layer 30 includes all the colored light described above, display of white light or projection of light of another color by appropriately adjusting a ratio of emitted light of different wavelengths is possible. Most of the light converted by passing through the wavelength conversion layer 30 is within a relatively small wavelength range and has a sharp spectrum having a relatively small full width at half maximum. Therefore, when color is finally implemented by filtering the light having such a sharp spectrum such as with a color filter, color reproduction at the optical member 100 may be improved.

Unlike the exemplary embodiment, incident light may be relatively short-wavelength light, such as infrared rays and the like. In this case, three wavelength conversion particles for separately respectfully converting the short-wavelength light into blue, green and red wavelengths may be disposed in the wavelength conversion layer 30 and white light may be projected therefrom.

The wavelength conversion layer 30 may further include the scattering particles. The scattering particles may be non-QDs which do not have a wavelength conversion function. The scattering particles may scatter light incident thereto so that more light may be incident on the wavelength conversion particles. Also, the scattering particles may serve to uniformly control projection angles of wavelength-specific light. Specifically, green and red wavelengths which are emitted after colliding with the wavelength conversion particles may have a scattered emission characteristic, where the scattering particles give the scattered emission characteristic to a blue wavelength which travels through the wavelength conversion layer 30 without colliding with the wavelength conversion particles, such that projection angles of wavelength-specific light may be adjusted to be similar to each other. Materials such as $TiO_2$, $SiO_2$ and the like may be used as the scattering particles.

The wavelength conversion layer 30 may cover an upper surface of the low refractive layer 20 and completely overlap the low refractive layer 20 in a top plan view. A lower surface of the wavelength conversion layer 30 may come in direct contact with the upper surface of the low refractive layer 20, such as to form an interface therebetween. In an exemplary embodiment, an outer edge of the side surfaces of the wavelength conversion layer 30 may be aligned with an outer edge of the side surfaces of the low refractive layer 20. The outer edge of the side surfaces of the wavelength conversion layer 30 may be positioned further from the side surface 10s1 than the boundary between the upper surface 10a of the light guide plate 10 and the edge surface 10r thereof.

The wavelength conversion layer 30 of the optical member 100 may be formed by using a method such as coating and the like. In an exemplary embodiment of manufacturing a display device, for example, a material for forming wavelength conversion is slit-coated on the light guide plate 10 on which the low refractive layer 20 has been formed, and then dried and cured to form the wavelength conversion layer 30. However, the method is not limited thereto, and various lamination methods may be used.

The passivation layer 40 is disposed on the low refractive layer 20 and the wavelength conversion layer 30. The passivation layer 40 serves to reduce or effectively prevent infiltration of moisture and/or oxygen (referred to as "moisture/oxygen" below) other layers or components on the light guide plate 10. The passivation layer 40 may include an inorganic material. In an exemplary embodiment, for example, the passivation layer 40 may include silicon nitride.

The passivation layer 40 may cover an upper surface of the wavelength conversion layer 30 and completely overlap the wavelength conversion layer 30. In an exemplary embodiment, the passivation layer 40 completely covers the low refractive layer 20 and the wavelength conversion layer 30. The passivation layer 40 completely overlaps an upper surface of the wavelength conversion layer 30 and further extends outward past the upper surface to cover the side surfaces of the wavelength conversion layer 30 and the side surfaces of the low refractive layer 20. The passivation layer 40 may come in direct contact with the upper surface 10a of the light guide plate 10. Side surfaces of the passivation layer 40 may be positioned further from the side surface 10s1 than the boundary between the upper surface 10a of the light guide plate 10 and the edge surface 10r thereof. In other words, the passivation layer 40 may not overlap the edge surface 10r of the light guide plate 10.

However, the passivation layer 40 is not limited thereto, and in some embodiments, the passivation layer 40 may not cover the side surfaces of the low refractive layer 20 and/or the side surfaces of the wavelength conversion layer 30.

The passivation layer 40 may be formed by using a method such as deposition and the like. In an exemplary embodiment of manufacturing a display device, for example, the passivation layer 40 may be formed on the light guide plate 10 on which the low refractive layer 20 and the wavelength conversion layer 30 have been formed in sequence, such as by using chemical vapor deposition ("CVD"). However, the method is not limited thereto, and various lamination methods may be used.

As described above, the optical member 100 may simultaneously perform a light guide function and a wavelength conversion function as a single integrated member. Also, in the optical member 100, the low refractive layer 20 is disposed on the upper surface 10a of the light guide plate 10 so that total reflection effectively occurs at the upper surface 10a of the light guide plate 10. An increase in total reflection efficiency owing to the low refractive layer 20 and the effective prevention of light leakage owing to the inclined edge surfaces 10r of the light guide plate 10 will be described below with reference to FIGS. 3 to 6.

Figure 3:
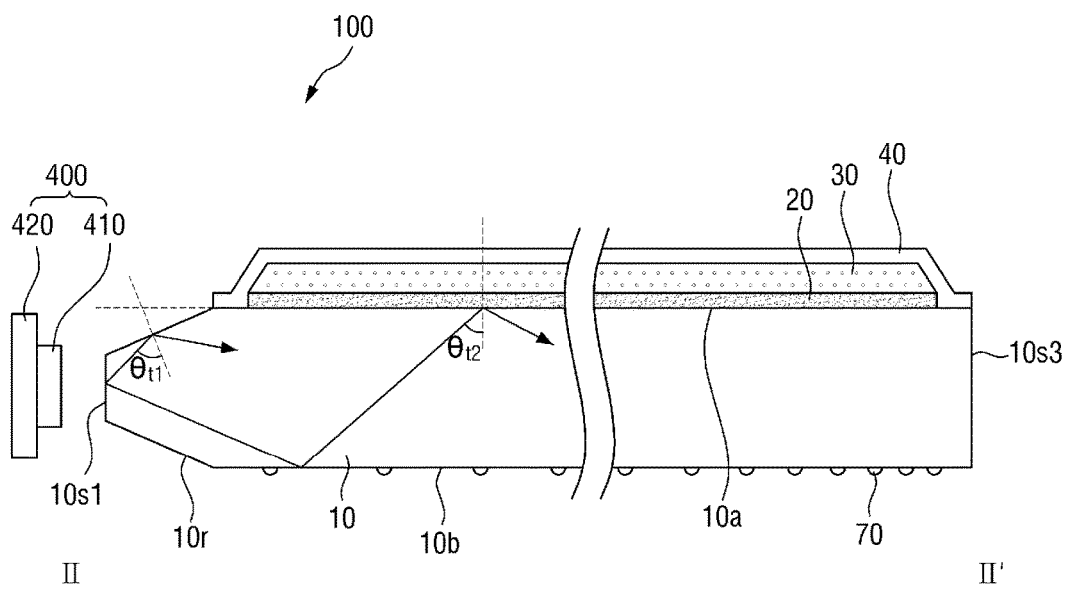
FIG. 3 is a cross-sectional view of an exemplary embodiment of region-specific threshold angles of a light guide plate within an optical member according to the invention.
Figure 4:
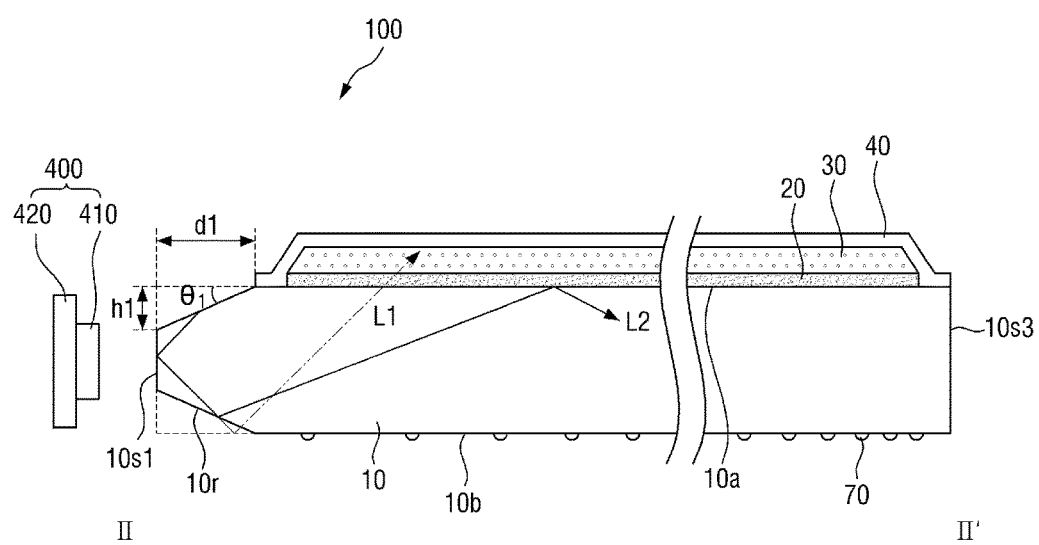
FIG. 4 is a cross-sectional view of paths of light at an edge portion of a light guide plate within a conventional optical member and an exemplary embodiment of an optical member according to the invention.
Figure 5A:
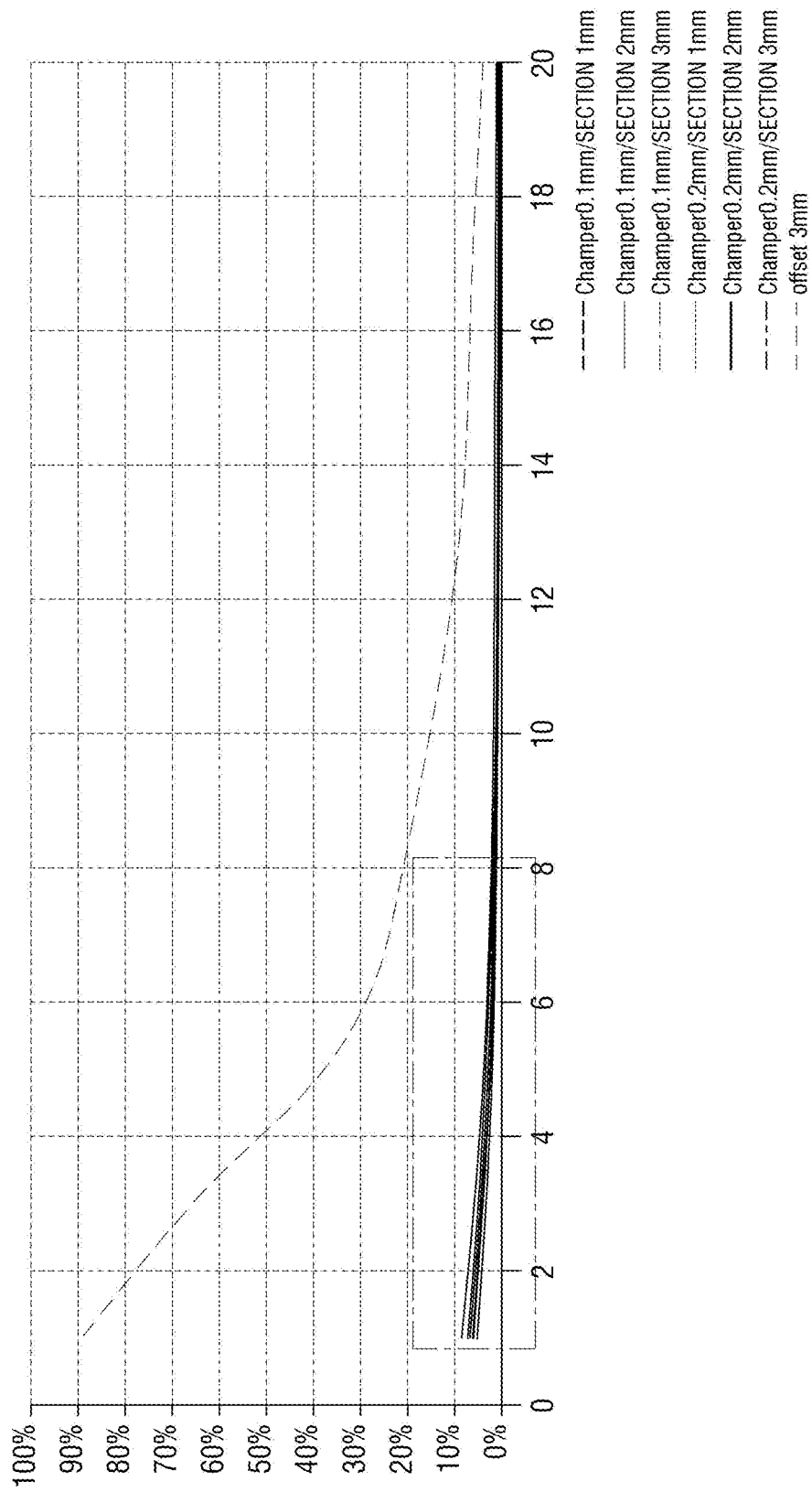
FIGS. 5A and 5B are graphs showing experimental results of amounts of light leakage caused by exemplary embodiments of an inclination angle and a length of an edge surface in an optical member according to the invention.
Figure 5B:
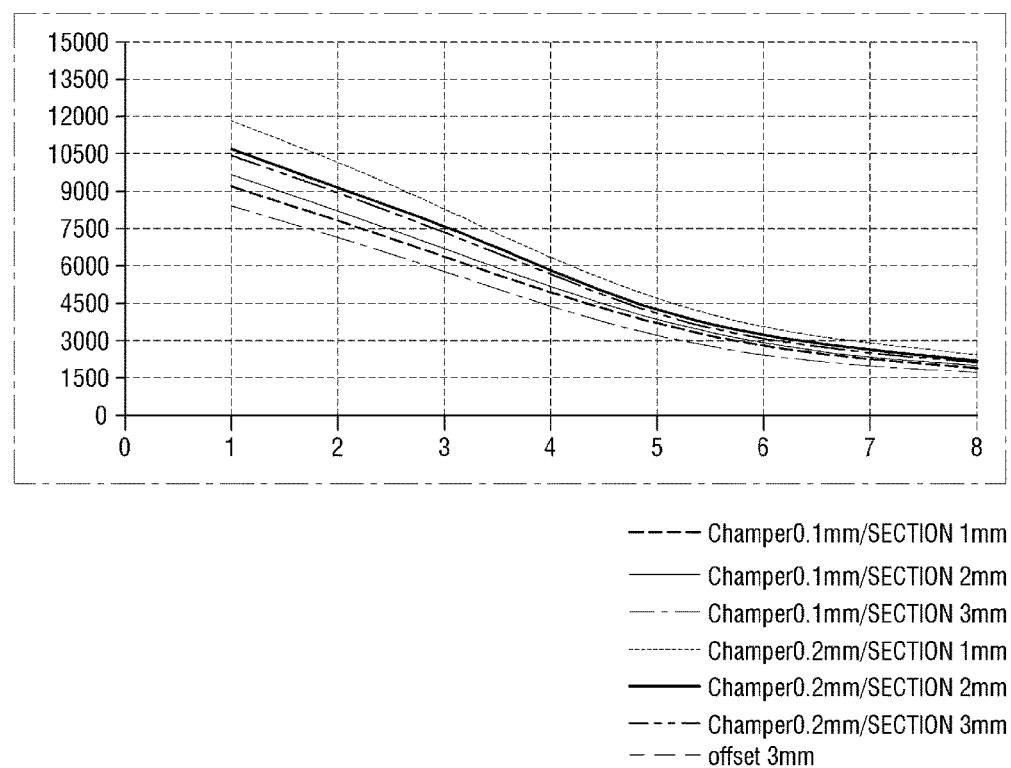
Figure 6:
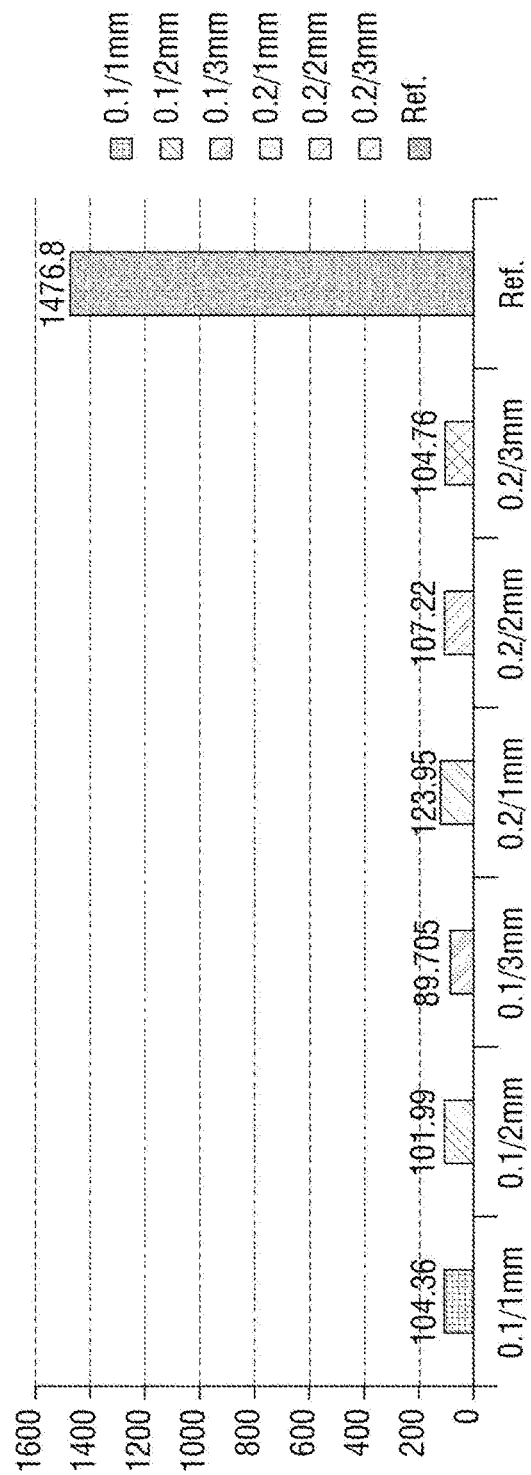
FIG. 6 is a graph showing experimental results of amounts of light leakage at a boundary between exemplary embodiments of an edge surface and an upper surface of a light guide plate in an optical member according to the invention.

FIG. 3 is a cross-sectional view of an exemplary embodiment of region-specific threshold angles of a light guide plate within an optical member according to the invention. FIG. 4 is a cross-sectional view of paths of light at an edge portion of a light guide plate within a conventional optical member and an exemplary embodiment of an optical member according to the invention. FIGS. 5A and 5B are graphs showing amounts of light leakage caused by exemplary embodiments of an inclination angle and a length of an edge surface in an optical member according to the invention. FIG. 6 is a graph showing amounts of light leakage at a boundary between exemplary embodiments of an edge surface and an upper surface of a light guide plate in an optical member according to the invention.

Referring to FIGS. 3 and 4, as described above, side surfaces of the low refractive layer 20, side surfaces of the wavelength conversion layer 30, and side surfaces of the passivation layer 40 are each disposed further from the side surface 10s1 than the boundary between the upper surface 10a and the edge surfaces 10r of the light guide plate 10. In other words, none of the low refractive layer 20, the wavelength conversion layer 30 and the passivation layer 40 overlaps the edge surfaces 10r of the light guide plate 10. The edge surfaces 10r of the light guide plate 10 may be exposed to an air layer outside the optical member 100.

The edge surface 10r of the light guide plate 10 has optical interfaces with the air layer outside the optical member 100. As described above, the threshold angle θt1 at the edge surface 10r of the light guide plate 10 may be about 42°. In other words, light which is incident on the edge surfaces 10r at an angle of about 42° or more may be totally reflected by the edge surface 10r. As illustrated in FIG. 3, the threshold angle θt1 is defined relative to a line normal to the edge surface 10r.

On the other hand, the upper surface 10a of the light guide plate 10 may come in direct contact with the low refractive layer 20. In an exemplary embodiment, for example, when the light guide plate 10 has a refractive index of about 1.5 and the low refractive layer 20 has a refractive index of about 1.25, a threshold angle θt2 at the upper surface 10a of the light guide plate 10 may be about 57°. In this case, it is possible to totally reflect light which is incident on the upper surface 10a at an angle of about 57° or more. As illustrated in FIG. 3, the threshold angle θt2 is defined relative to a line normal to the upper surface 10a.

In a conventional optical member, for example, a light guide plate 10 may not include the edge surface 10r according to the invention, and the side surface 10s1 and the lower surface 10b of the light guide plate 10 may intersect each other at an angle of about 90°, as indicated by the dotted line extensions of the upper surface 10a, the lower surface 10b and the side surface 10s1 in FIG. 4. Since the lower surface of the light guide plate 10 in the conventional optical member has an optical interface with the air layer, a threshold angle may be about 42° with respect to the lower surface 10b of the light guide plate 10. As illustrated in FIG. 4, first light L1, which is incident on the lower surface 10b of the light guide plate 10 at an angle smaller than the threshold angle, is not totally reflected within the conventional optical member. Some rays of the first light L1 may be projected through the lower surface 10b to be leaked, and other rays of the first light L1 may be reflected and transmitted to the upper surface 10a of the light guide plate 10. In this case, the first light L1 is also incident on the upper surface 10a of the light guide plate 10 at an angle smaller than the threshold angle θt2, and thus may be projected upward without being totally reflected. In this way, when a large amount of light leaks upward at the light incident surface 10s1 to which a large amount of light is projected from the light source 400, light leakage may be detected in a display screen.

On the other hand, second light L2 that is incident on the light incident surface 10s1 of the light guide plate 10 in an exemplary embodiment of an optical member at the same angle as the first light L1 may have a larger incident angle than the threshold angle θt1. In other words, since one or more exemplary embodiment of the optical member includes a light guide plate 10 defining the edge surface 10r inclined by the angle θ1 with respect to the lower surface 10b, the second light L2 may have a larger incident angle than the first light L1. Accordingly, the second light L2 has a larger incident angle than the threshold angle θt1 at the edge surfaces 10r, and thus may be totally reflected in the light guide plate 10. Therefore, in one or more exemplary embodiment of the optical member according to the invention, the amount of light that leaks to above the light guide plate 10 (e.g., an emission side of the optical member) at the side of the light incident surface 10s1 is reduced such that light leakage may be reduced or effectively prevented and luminance uniformity may be increased.

The inclination angle θ1 of the edge surfaces 10r may be determined in consideration of the threshold angle θt1 of the light guide plate 10 with respect to the air layer and the threshold angle θt2 of the light guide plate 10 with respect to the low refractive layer 20. In other words, since the threshold angle θt2 with respect to the low refractive layer 20 is larger than the threshold angle θt1 with respect to the air layer, light has a larger incident angle than the threshold angle θt2 with respect to the low refractive layer 20 so that light is effectively guided in the light guide plate 10.

In this regard, the inclination angle θ1 of the edge surfaces 10r may be about 6° to about 20°. When the inclination angle θ1 of the edge surfaces 10r is larger than 6°, a path of light may be effectively adjusted so that the light has an incident angle larger than the threshold angle θt2 with respect to the low refractive layer 20. When the inclination angle θ1 of the edge surfaces 10r is smaller than 20°, a path of light may be effectively adjusted while ensuring a sufficient the planar area of the light incident surface 10s1 of the light guide plate 10. Also, light having incident angles smaller than a threshold angle is concentrated at the light incident surface 10s1. In consideration of the inclination angle θ1 of the edge surfaces 10r, a distance sufficient for changing paths of the light having relatively small incident angles is possible when the distance d1 from the light incident surface 10s1 to the boundary between the edge surfaces 10r and the upper/lower surface 10a/10b is about 0.84 mm or more. In an exemplary embodiment, the distance d1 from the light incident surface 10s1 to the boundary between the edge surfaces 10r and the upper/lower surface 10a/10b is about 1 mm or more.

To experimentally confirm an improvement in light leakage caused by the edge surfaces 10r, as an exemplary embodiment according to the invention a glass light-guide plate 10 having a thickness of 1.1 mm and including the edge surfaces 10r was prepared. As a comparative example, a glass light-guide plate that did not have the edge surfaces 10r and had an upper/lower surface intersecting side surfaces at right angles was prepared. FIG. 5A is a graph showing results of measuring the amounts of light projected upward at the light incident surface 10s1 when the respective exemplary embodiment and comparative light guide plates were used. FIG. 5B is an enlarged portion of the graph of FIG. 5A showing various exemplary embodiments of an optical member according to the invention. FIG. 6 is a graph showing the amounts of upward light leakage at the light incident surface 10s1 when the respective light guide plates were used.

Referring to FIGS. 5A and 5B, the (horizontal) x-axis of the graph denotes a relative distance (in mm) of a light incident surface edge portion from an active area of a light guide plate, and the y-axis denotes the amount of output light (in percent %) according to the height h1 (refer to FIG. 2) of the edge surface 10r and the length d1 (refer to FIG. 2) of the section occupied by the edge surface 10r. It is possible to see that the amount of light projected upward at the light incident surface 10s1 was reduced in the light guide plate 10 including the edge surfaces 10r ("ChamperXmm/SECTION Ymm" lines) in comparison to that in the light guide plate not including the edge surfaces 10r ("offset 3 mm" line"). Specifically, it is possible to see that the least amount of light was projected above the light guide plate 10 at the light incident surface 10s1 when the height h1 of the edge surfaces 10r was 0.1 mm and the length d1 was 3 mm in an exemplary embodiment of an optical member according to the invention.

Referring to the graph of FIG. 6, the height h1 of the edge surface 10r was 0.1 mm or 0.2 mm in exemplary embodiments of an optical member according to the invention. Amounts of light leakage at the light incident surface 10s1 of the light guide plate 10 are shown as relative values along the y-axis, while the length d1 of the section occupied by the edge surfaces 10r varied between 1 mm to 3 mm in combinations with the height h1 are shown along the x-axis. It is possible to see that the amount of light leakage was reduced in the light guide plate 10 in exemplary embodiments of an optical member according to the invention ("0.X/Ymm" bars) in comparison to that in the light guide plate according to a comparative example ("Ref" bar) not including the edge surface 10r. Specifically, the most effective improvement in light leakage occurred when the height h1 of the edge surface 10r was 0.1 mm and the length d1 was 3 mm in the exemplary embodiment of the optical member according to the invention.

As described above, one or more exemplary embodiment of the light guide plate 10 including the edge surface 10r may reduce or effectively prevent light leakage and increase luminance uniformity of an optical member by improving total reflection efficiency.

Other exemplary embodiments of an optical member will be described below. Descriptions of elements identical to those described above will be omitted or given briefly, and differences will be mainly described.

Figure 8:
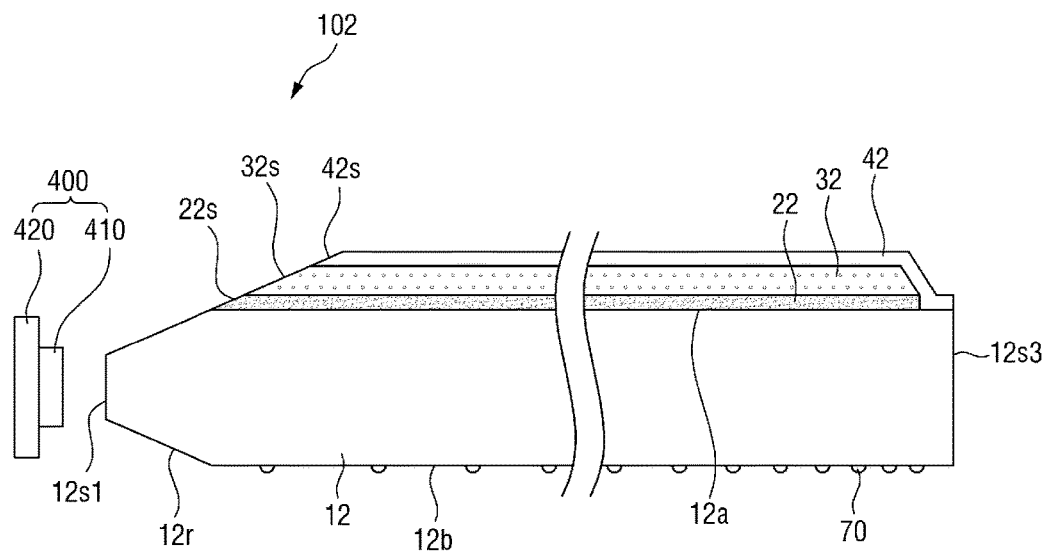
Figure 9:
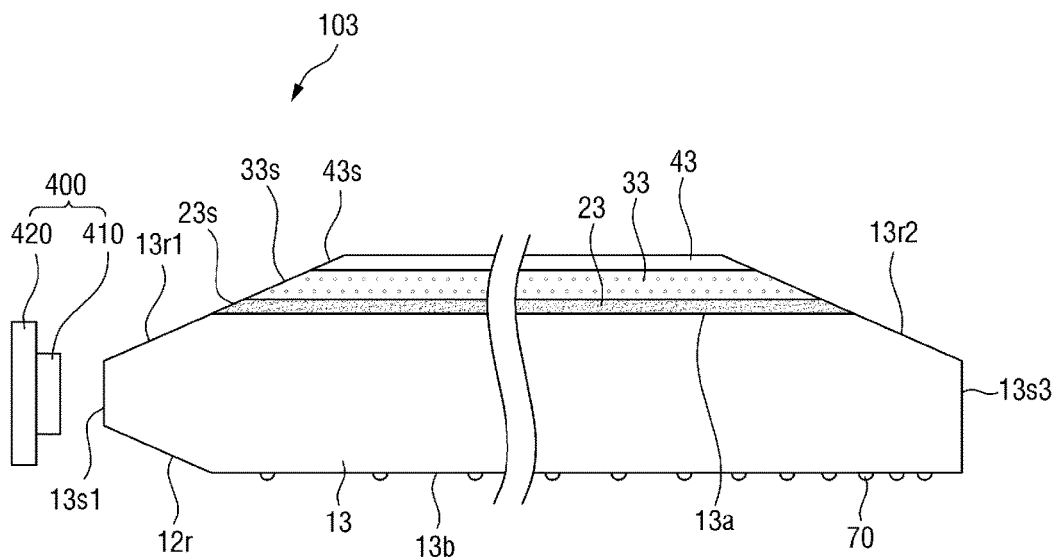

FIGS. 7 to 9 are cross-sectional views of modified exemplary embodiments of an optical member according to the invention. The exemplary embodiments of FIGS. 7 to 9 illustrate that the shapes and arrangement of respective elements of an optical member may be variously modified.

FIG. 7 illustrates that the edge surfaces 11r of a light guide plate 11 in the optical member 101 may be a curved surface in cross-section. In other words, the edge surface 10r of the light guide plate 10 in the optical member 100 of FIG. 2 differs from the edge surface 11r of FIG. 7 in that edge surface 10r is a flat surface in cross-section. The light guide plate 11 may further include or define an upper surface 11a, a lower surface 11b, a light incident side surface 11s1 and a light-facing side surface 11s3.

The shapes of the edge surface 11r of the light guide plate 11 may be variously modified as long as a path of light changed by the edge surface 11r satisfies a total reflection angle.

FIG. 8 illustrates that a side surface 22s of a low refractive layer 22, a side surface 32s of a wavelength conversion layer 32, and a side surface 42s of a passivation layer 42 may be aligned with (e.g., coplanar with) an edge surface 12r of a light guide plate 12. In this case, the passivation layer 42 may cover neither the side surface 22s of the low refractive layer 22 nor the side surface 32s of the wavelength conversion layer 32 at a light incident surface 12s1 end portion of the light guide plate 12. The light guide plate 12 may further include or define an upper surface 12a, a lower surface 12b and a light-facing side surface 12s3.

The side surface 22s of the low refractive layer 22 may be aligned at a boundary between the edge surface 12r and an upper surface 12a of the light guide plate 12. An inclination angle of the side surface 22s of the low refractive layer 22 may be substantially the same as an inclination angle θ1 of the edge surface 12r. In other words, the side surface 22s of the low refractive layer 22 may be disposed in substantially the same plane as the edge surface 12r.

The side surface 32s of the wavelength conversion layer 32 may be disposed further from the light incident surface 12s1 than the boundary between the edge surface 12r and the upper surface 12a of the light guide plate 12. The side surface 32s of the wavelength conversion layer 32 may be substantially aligned with a boundary between the side surface 22s and an upper surface of the low refractive layer 22. An inclination angle of the side surface 32s of the wavelength conversion layer 32 may be substantially the same as the inclination angle θ1 of the edge surface 12r. In other words, the side surface 32s of the wavelength conversion layer 32 may also be disposed in substantially the same plane as the edge surface 12r.

The side surface 42s of the passivation layer 42 may be disposed further from the light incident surface 12s1 than the boundary between the edge surface 12r and the upper surface 12a of the light guide plate 12. The side surface 42s of the passivation layer 42 may be substantially aligned with a boundary between an upper surface and the side surface 32s of the wavelength conversion layer 32. An inclination angle of the side surface 42s of the passivation layer 42 may be substantially the same as the inclination angle θ1 of the edge surface 12r. In other words, the side surface 42s of the passivation layer 42 may also be disposed in substantially the same plane as the edge surface 12r.

In an exemplary embodiment of manufacturing an optical member, a structure such as an optical member 102 of FIG. 8 may be obtained by stacking the low refractive layer 22, the wavelength conversion layer 32 and the passivation layer 42 on the light guide plate 12 to have ends corresponding to the light incident surface 12s1 and then cutting off the light guide plate 12 to form the edge surface 12r. In other words, the side surface 22s of the low refractive layer 22, the side surface 32s of the wavelength conversion layer 32 and the side surface 42s of the passivation layer 42 may be cut surfaces obtained together with the edge surface 12r when portions of the layers are removed from the originally-stacked structure.

An optical member 103 of FIG. 9 illustrates that a second edge surface 13r2 may also be disposed or formed at a light-facing surface 13s3 of the light guide plate 13.

The light guide plate 13 may include a first edge surface 13r1 disposed or formed at a light incident surface 13s1 and further include the second edge surface 13r2 disposed or formed at the light-facing surface 13s3. The second edge surface 13r2 may be disposed or formed not only between the light-facing surface 13s3 and an upper surface 13a but also between the light-facing surface 13s3 and a lower surface 13b. Although not shown in the drawing, an edge surface may also be formed at other side surfaces (e.g., like 10s2 and 10s4 relative to 10s1 and 10s3 in FIG. 1) of the light guide plate 13.

An inclination angle of the second edge surface 13r2 may be the same as or different from an inclination angle θ1 of the first edge surface 13r1.

FIG. 9 further illustrates that a side surface 23s of a low refractive layer 23, a side surface 33s of a wavelength conversion layer 33, and a side surface 43s of a passivation layer 43 may be aligned with (e.g., coplanar with) edge surfaces 13r1 and/or 13r2 of the light guide plate 13. In this case, the passivation layer 43 may cover neither the side surface 23s of the low refractive layer 23 nor the side surface 33s of the wavelength conversion layer 33 at the light incident surface 13s1 or the light-facing surface 13s3 end portions of the light guide plate 13.

Since the edge surfaces 13r1 and 13r2 adjust a path of light and also reduce or effectively prevent breakage of corners of the light guide plate 13 during manufacturing of an optical member, the light guide plate 13 may have excellent durability.

Figure 11:
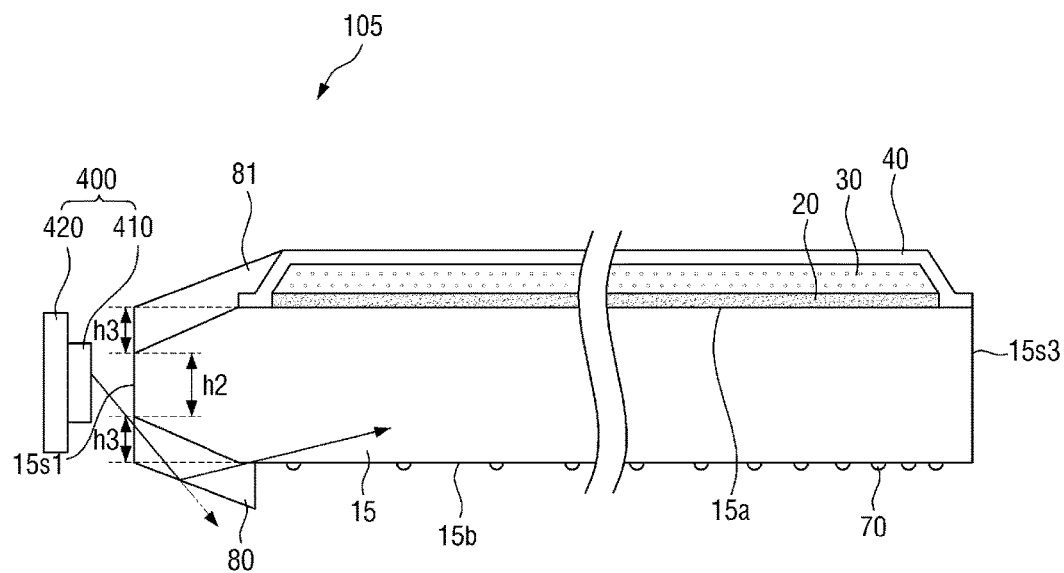
Figure 12:
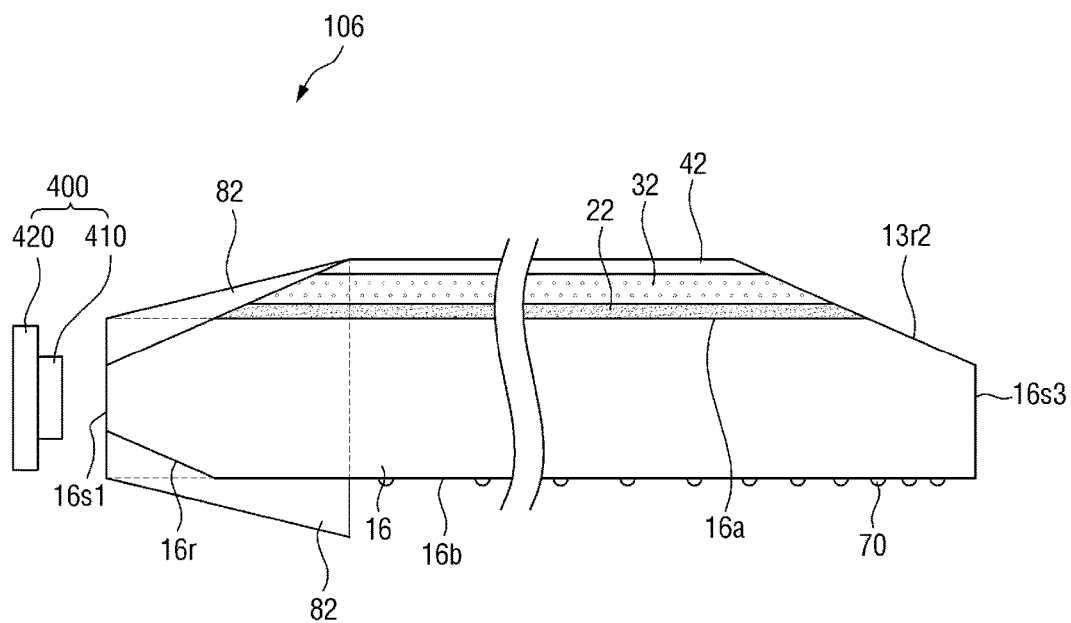

FIGS. 10 to 12 are cross-sectional views of other exemplary embodiments of optical members according to the invention. The exemplary embodiments of FIGS. 10 to 12 illustrate that an optical member may further include a light adjustment member.

FIG. 10 illustrates that a light guide plate 14 of an optical member 104 may not include an edge surface defined by a body of the light guide plate 14. In other words, a plane in which the upper/lower surface 14a/14b of the light guide plate 14 is positioned may be inclined by about 90° with respect to a plane in which a side surface 14s is positioned (e.g., such as the light incident surface 14s1 and a light-facing surface 14s3).

The upper surface 14a of the light guide plate 14 may be divided into a first region that is relatively adjacent to the light incident surface 14s1 and a second region that is relatively adjacent to the light-facing surface 14s3. A low refractive layer 20, a wavelength conversion layer 30 and a passivation layer 40 may be disposed on the second region of the upper surface 14a of the light guide plate 14, and a light adjustment member 80 may be disposed on the first region. The light adjustment member 80 may come in direct contact with the upper surface 14a of the light guide plate 14 in the first region. On the other hand, in the second region, the low refractive layer 20, the wavelength conversion layer 30, and the passivation layer 40 may be disposed between the light adjustment member 80 and the light guide plate 14. Outer edges of the low refractive layer 20, the wavelength conversion layer 30, the passivation layer 40 and/or the light adjustment member 80 may define a boundary between the first and second regions.

The light adjustment member 80 may be disposed not only at the upper surface 14a but also on the lower surface 14b of the light guide plate 14. The light adjustment members 80 disposed on the upper surface 14a and the lower surface 14b may have generally symmetric shapes with respect to the light guide plate 14 therebetween.

The light adjustment members 80 may come in direct contact with the upper surface 14a and the lower surface 14b of the light guide plate 14. Refractive indices of the light adjustment members 80 may be the same as or higher than a refractive index of the light guide plate 14. In an exemplary embodiment of manufacturing an optical member, for example, when the light adjustment members 80 are formed by imprinting, a resin material having a refractive index that is the same as or higher than the refractive index of the light guide plate 14 may be used. In an exemplary embodiment of manufacturing an optical member, the light adjustment member 80 formed on the lower surface 14b of the light guide plate 14 may be formed together with a scattering pattern 70 such as at a same time, in a same process and or from a same material layer.

In a conventional optical member, when the refractive indices of the light adjustment members 80 are the same as the refractive index of the light guide plate 14, boundaries between the light adjustment members 80 and the light guide plate 14 are not recognized as optical interfaces, and thus light may be incident onto the light adjustment members 80 without being reflected or refracted at the boundaries. In one or more exemplary embodiment of an optical member according to the invention, when the refractive indices of the light adjustment members 80 are higher than the refractive index of the light guide plate 14, upper-surface threshold angles of the light adjustment members 80 exposed to the air layer further increase, and thus more effective optical interfaces are formed.

The light adjustment members 80 may lengthwise extend in a longitudinal direction along a length of the side surface 14s1 of the light guide plate 14. Heights of the light adjustment members 80 along a thickness direction (e.g., vertical in FIG. 10) may generally increase in a direction from the side surface 14s1 of the light guide plate 14 toward the inside of the light guide plate 14 (e.g., toward the light-facing surface 14s3). In other words, a vertical distance from the upper surface 14a of the light guide plate 14 to an upper surface of the light adjustment member 80 may increase in a direction from the side surface 14s1 of the light guide plate 14 toward the inside of the light guide plate 14. The maximum vertical distance from the upper surface 14a of the light guide plate 14 to the upper surface of the light adjustment member 80 may be substantially the same as a height from the upper surface 14a of the light guide plate 14 to an uppermost surface of the passivation layer 40. However, the vertical distance is not limited thereto, and the light adjustment member 80 may be disposed or formed to protrude further from the uppermost surface of the passivation layer 40.

The light adjustment members 80 may perform a function similar to that of the edge surfaces 10r defined by a body of the light guide plate 10 (refer to FIGS. 1-4). In other words, the light adjustment members 80 may adjust a path of light incident to the light guide plate 14 to increase total reflection efficiency in the light guide plate 14 and to reduce or effectively prevent light leakage at the light incident surface 14s1. It is considered that a collective light guide member may include the light guide plate 14 and the light adjustment members 80, when an inclined edge surface of such light guide member is defined by the light adjustment members 80.

Specifically, since the upper surface of the light adjustment member 80 is inclined with respect to the upper surface 14a of the light guide plate 14, an incident angle θ3 of light L4 with respect to the upper surface of the light adjustment member 80 may be larger than an incident angle θ2 of light L3 with respect to the upper surface 14a of the light guide plate 14. In other words, even when the incident angle θ2 with respect to the upper surface 14a of the light guide plate 14 is smaller than a threshold angle, the incident angle θ3 with respect to the upper surface of the light adjustment member 80 may be larger than a threshold value. In this case, even when the third light L3 and the fourth light L4 are incident at the same angle from the light source 400, the third light L3 has the incident angle θ2 smaller than the threshold angle of the upper surface 14a of the light guide plate 14 and thus goes through the upper surface 14a light guide plate 14, whereas the fourth light L4 has the incident angle θ3 larger than the threshold angle of the upper surface of the light adjustment member 80 and thus may be totally reflected back into the light guide plate 14. In this way, the light adjustment members 80 may perform a function substantially similar to that of the edge surfaces 10r of the light guide plate 10.

FIG. 11 illustrates that a light guide plate 15 of an optical member 105 may include edge surfaces 15r. The light guide plate 15 may further include or define an upper surface 15a, a lower surface 15b, and a light-facing side surface 15s3.

Light adjustment members 81 may be respectively disposed on the edge surfaces 15r of the light guide plate 15. The light adjustment members 81 may cover the edge surfaces 15r and compensate for a planar area of a light incident surface 15s1 defined by a body of the light guide plate 15 which is reduced by the edge surfaces 15r.

Specifically, a height h2 of the light incident surface 15s1 of the light guide plate 15 is reduced by double a height h3 of the edge surfaces 15r. In this case, the planar area of the light incident surface 15s1 is reduced, and the amount of light incident into the light guide plate 15 may be reduced. The light adjustment members 81 may increase the planar area of a total light incident surface of the light guide plate 15 by compensating for height differences caused by the height h3 of the edge surfaces 15r. Accordingly, the degree of freedom in selecting an inclination angle and the height h3 of the edge surfaces 15r may increase regardless of the planar area of the light incident surface 15s1 defined by a body of the light guide plate 15.

Referring to FIG. 12, side surfaces of a low refractive layer 26, a wavelength conversion layer 36 and a passivation layer 46 of an optical member 106 may be aligned with (e.g., coplanar with) an edge surface 16r of a light guide plate 16. The light guide plate 16 may further include or define an upper surface 16a, a lower surface 16b, a light incident surface 16s1 and a light-facing side surface 16s3.

A light adjustment member 82 may cover the edge surface 16r and further extend inward to cover the side surfaces of the low refractive layer 26, the wavelength conversion layer 36 and the passivation layer 46. In this exemplary embodiment, the passivation layer 46 does not cover side surfaces of the wavelength conversion layer 36 and the low refractive layer 26, but the light adjustment member 82 instead covers the side surfaces of the wavelength conversion layer 36 and the low refractive layer 26 such that a sealed structure may be maintained. Therefore, durability of the wavelength conversion layer 36 is improved by reducing of preventing infiltration of moisture/oxygen into the wavelength conversion layer 36.

FIG. 13 is a cross-sectional view of still another exemplary embodiment of an optical member according to the invention.

Referring to FIG. 13, an optical member 107 may further include an angle filter 90.

The angle filter 90 may be disposed on a light incident surface 17s1 of a light guide plate 17. Among rays of light projected from a light source 400, the angle filter 90 reflects rays of light having an incident angle larger than a first angle with respect to the light incident surface 17s1 and passes rays of light having an incident angle smaller than the first angle. In other words, rays of light having an incident angle smaller than a threshold angle of an upper/lower surface 17a/17b of the light guide plate 17 are filtered before being incident into the light guide plate 17, and rays of light having an incident angle larger than the threshold angle of the upper/lower surface 17a/17b are passed through the light incident surface 17s1 opposite to the light-facing surface 17s3, such that total reflection efficiency in the light guide plate 17 may be increased.

In consideration of the threshold angle of the upper/lower surface 17a/17b of the light guide plate 17, the first angle may be about 54°. In other words, light having an incident angle larger than about 54° with respect to the light incident surface 17s1 of the light guide plate 17 may be reflected, and light having an incident angle smaller than about 54° may be passed through the angle filter 90 and incident onto the light guide plate 17.

The light source 400 may further include a reflection member 700. The reflection member 700 re-reflects light reflected by the angle filter 90 and causes the light to be incident onto the light guide plate 17. Light reflected by the reflection member 700 has an incident angle smaller than the first angle and may pass through the angle filter 90. The reflection member 700 may increase light incident efficiency by reusing light that has not entered the light guide plate 17, and may reduce or effectively prevent light leakage at the light incident surface 17s1.

The optical members 100 to 107 according to the various exemplary embodiments described above may be applied to display devices, lighting fixtures and the like, to generate and provide light. A display device including an optical member will be described in detail below.

Figure 14:
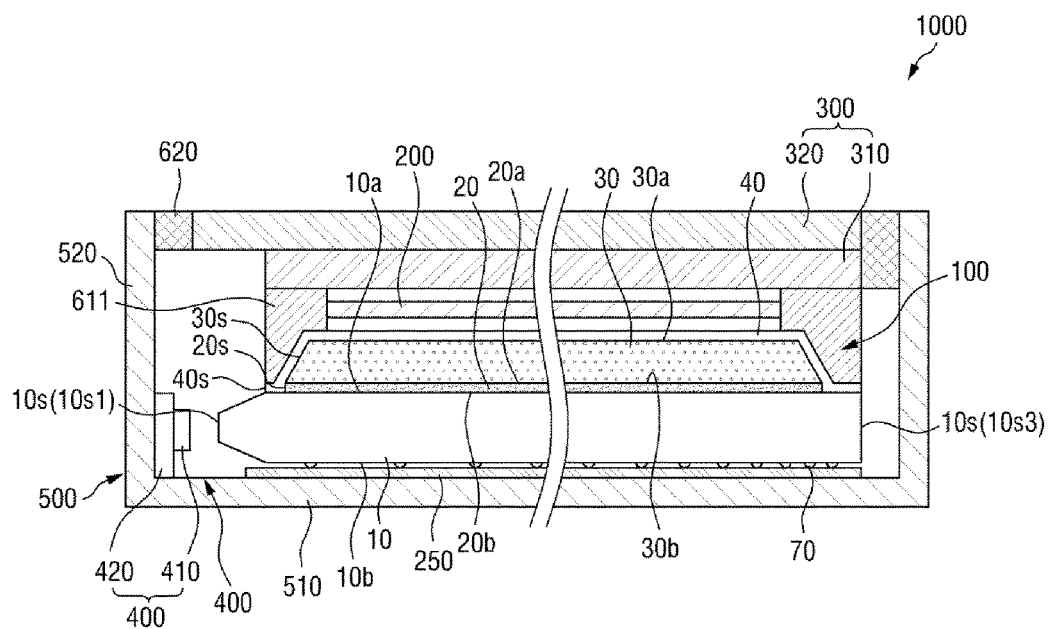
FIG. 14 is a cross-sectional view of an exemplary embodiment of a display device according to the invention.

FIG. 14 is a cross-sectional view of an exemplary embodiment of a display device according to the invention.

Referring to FIG. 14, a display device 1000 includes a light source 400, an optical member 100 disposed in a light projection (emission) path of the light source 400, and a display panel 300 disposed over the optical member 100.

Any of the optical members 100 to 107 and features thereof according to the above-described exemplary embodiments may be used. FIG. 14 illustrates a case in which the optical member 100 of FIG. 2 used.

The light source 400 is disposed at a side of the optical member 100. The light source 400 may be disposed adjacent to the light incident surface 10s1 of the light guide plate 10. The light source 400 may include a point light source or a linear light source provided in singularity or plurality. The point light sources may be a plurality of the LED light source 410. The plurality of LED light sources 410 may be mounted on the PCB 420. The LED light sources 410 may generate and emit light of a blue wavelength.

The display device 1000 may further include a reflection member 250 disposed under the optical member 100. The reflection member 250 may include a reflection film or a reflection coating layer. The reflection member 250 reflects light projected through the lower surface 10b of the light guide plate 10 in the optical member 100 and causes the light to re-enter the light guide plate 10.

The display panel 300 is disposed over the optical member 100. The display panel 300 receives light from the optical member 100 and displays a picture or image with the received light. The display panel 300 may be a liquid crystal display ("LCD") panel, but is not limited thereto.

The display panel 300 may include a first (display) substrate 310, a second (display) substrate 320 opposite to the first substrate 310, and an optical transmittance layer such as a liquid crystal layer (not shown) disposed between the first substrate 310 and the second substrate 320 and with which light is transmitted or blocked.

The optical member 100 may be coupled with the display panel 300 through inter-module coupling member 611. The inter-module coupling member 611 may have a rectangular frame shape in a plan view. The inter-module coupling member 611 may be positioned at respective edge portions of the display panel 300 and the optical member 100. The inter-module coupling member 611 may be disposed to not overlap the edge surfaces 10r of the light guide plate 10, and the edge surfaces 10r may be exposed to an air layer outside of the optical member 100.

The inter-module coupling member 611 may include a polymer resin, an adhesive or viscous tape, or the like.

The display device 1000 may further include a housing 500 in which other components of the display device 1000 are accommodated. The housing 500 has one open side at an upper portion thereof, and includes a bottom surface 510 and a sidewall 520 which is connected to the bottom surface 510. The light source 400, the optical member 100, the display panel 300, the inter-module coupling member 611, and the reflection member 250 may be contained in a space defined by the bottom surface 510 and the sidewall 520 of the housing 500.

The display device 1000 may further include at least one optical film 200. The at least one optical film 200 may be contained in a space surrounded by the inter-module coupling member 611 and defined between the optical member 100 and the display panel 300.

The optical film 200 may include one or more individual film such as a prism film, a diffusion film, a microlens film, a lenticular film, a polarizing film, a reflective polarizer film, a phase difference film and the like, but is not limited thereto.

In the display device 1000 according to an exemplary embodiment of FIG. 14, the optical member 100, the display panel 300, and even the optical film 200 are integrated by the inter-module coupling member 611, and the display panel 300 and the housing 500 are coupled together by a housing coupling member 620. Therefore, even when a mold frame of a convention display device is omitted, several members of the display device 1000 are stably coupled together, such that the display device 1000 may be reduced in overall weight. Also, since the light guide plate 10 and the wavelength conversion layer 30 are integrated into a single optical member 100 which performs a light guiding function and a wavelength converting function, the display device 1000 may be reduced in overall thickness. Further, a side surface of the display panel 300 and the sidewall 520 of the housing 500 are coupled together by the housing coupling member 620, and thus a total planar area of a bezel at a display side of the display device 1000 is minimized or removed entirely.

The effects according to one or more exemplary embodiment of the present disclosure are as follows.

An optical member according to one or more exemplary embodiment according to the invention can perform a light guide function exhibiting an excellent straight-line travel characteristic of light.

Effects of exemplary embodiments are not limited to the aforementioned example, and various effects are included in this specification.

Although exemplary embodiments of the present disclosure have been described above with reference to the accompanying drawings, those of ordinary skill in the technical field to which the present disclosure pertains will appreciate that the embodiments may be implemented in other concrete forms without changing the technical spirit or essential features of the present disclosure. Therefore, the above-described embodiments are to be understood as exemplary rather than limiting in all features.

What is claimed is:

1. An optical member comprising:
a light guide plate in which light incident thereto is propagated, including:
an emission surface through which propagated light exits the light guide plate,
a light incident side surface through which the light is incident to the light guide plate, and
an inclined edge surface connecting the emission surface and the light incident side surface to each other; and
a wavelength conversion layer to which exited light from the light guide plate is incident and which converts a wavelength of the exited light, disposed facing the emission surface of the light guide plate,
wherein
the inclined edge surface and the emission surface of the light guide plate define a boundary therebetween, and
a side surface of the wavelength conversion layer which is closest to the light incident side surface of the light guide plate is further from the light incident side surface than the boundary between the inclined edge surface and the emission surface of the light guide plate.

2. The optical member of claim 1, wherein the inclined edge surface of the light guide plate is exposed to outside the optical member.

3. The optical member of claim 2, wherein an inclination angle of the inclined edge surface of the light guide plate with respect to the emission surface of the light guide plate is about 6° to about 20°.

4. The optical member of claim 3, wherein a distance from the light incident side surface of the light guide plate to the boundary between the inclined edge surface and the emission surface of the light guide plate is about 0.84 millimeter or more.

5. The optical member of claim 4, wherein the distance from the light incident side surface of the light guide plate to the boundary between the inclined edge surface and the emission surface of the light guide plate is about 1 millimeter or more.

6. The optical member of claim 1, wherein the light guide plate includes an inorganic material.

7. The optical member of claim 6, further comprising a refractive layer disposed between the emission surface of the light guide plate and the wavelength conversion layer, wherein
a refractive index of the refractive layer is smaller than a refractive index of the light guide plate including the inorganic material, and
a difference between the refractive index of the light guide plate including the inorganic material and the refractive index of the refractive layer is about 0.2 or more.

8. The optical member of claim 7, wherein an inclination angle of the inclined edge surface of the light guide plate with respect to the emission surface of the light guide plate is about 6° to about 20°.

9. The optical member of claim 1, wherein with respect to the emission surface of the light guide plate, an inclination angle of the side surface of the wavelength conversion layer is identical to an inclination angle of the inclined edge surface of the light guide plate.

10. The optical member of claim 9, wherein the side surface of the wavelength conversion layer is coplanar with the inclined edge surface of the light guide plate.

11. The optical member of claim 1, further comprising:
a refractive layer disposed between the emission surface of the light guide plate and the wavelength conversion layer, a refractive index of the refractive layer being smaller than that of the light guide plate; and
a passivation layer through which converted light from the light conversion layer exits the optical member, disposing the wavelength conversion layer between the refractive layer and the passivation layer.

12. The optical member of claim 11, wherein a side surface of the refractive layer and a side surface of the passivation layer which are closest to the light incident side surface of the light guide plate are each further from the light incident side surface than the boundary between the inclined edge surface and the emission surface of the light guide plate.

13. The optical member of claim 12, wherein with respect to the emission surface of the light guide plate, an inclination angle of the side surface of the refractive layer, an inclination angle of the side surface of the wavelength conversion layer, and an inclination angle of the side surface of the passivation layer are identical to an inclination angle of the inclined edge surface of the light guide plate.

14. The optical member of claim 1, further comprising a light adjustment member with which a path of light is adjusted to be incident into the light guide plate, the light adjacent member disposed on the inclined edge surface of the light guide plate.

15. The optical member of claim 14, wherein the light adjustment member disposed on the inclined edge surface of the light guide plate extends therefrom to cover the side surface of the wavelength conversion layer.

16. The optical member of claim 15, wherein a refractive index of the light adjustment member is equal to or greater than a refractive index of the light guide plate.

17. The optical member of claim 15, wherein a side surface of the light adjustment member extends from and is coplanar with the light incident side surface of the light guide plate to define a continuous light incident side surface of the optical member.

* * * * *